3,572,206
CONTOUR MILLING MACHINE
Tibor Eckstein and Henry H. Johnson, Oakland, Calif.,
assignors to Hexcel Corporation, Dublin, Calif.
Filed Apr. 1, 1969, Ser. No. 811,928
Int. Cl. B23c 1/16, 3/02
U.S. Cl. 90—13                                    14 Claims

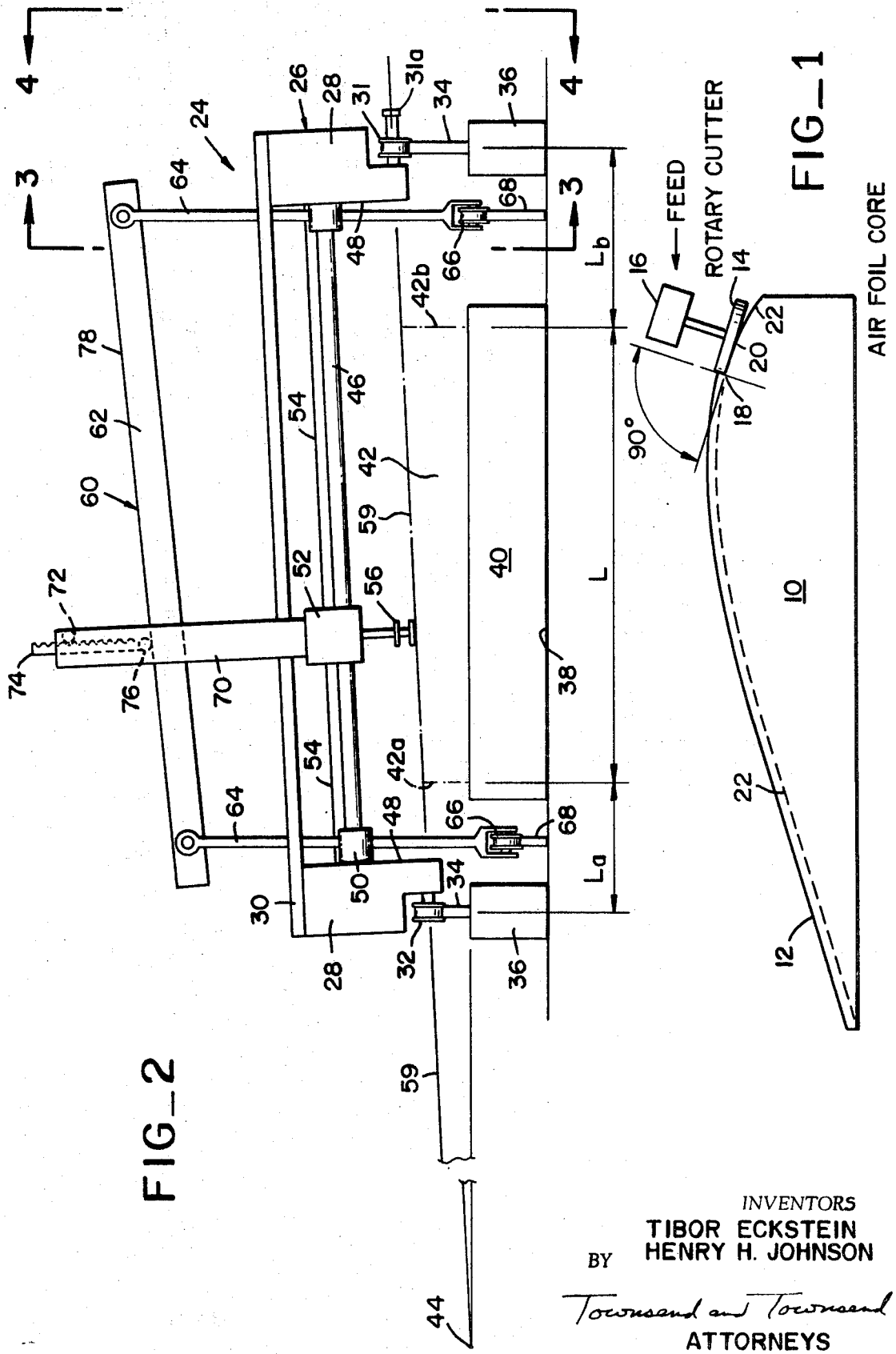

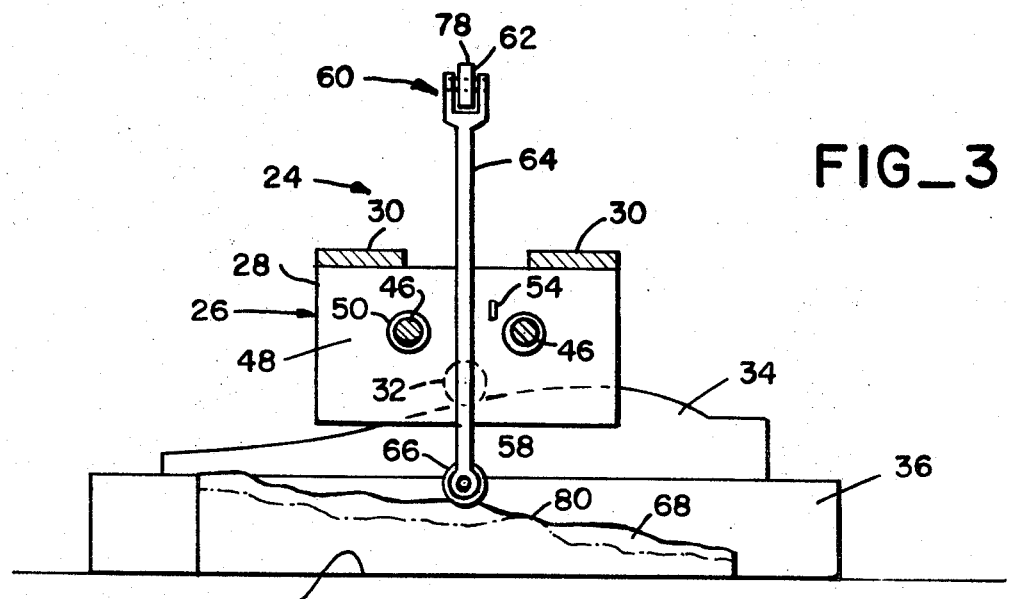
FIG_3
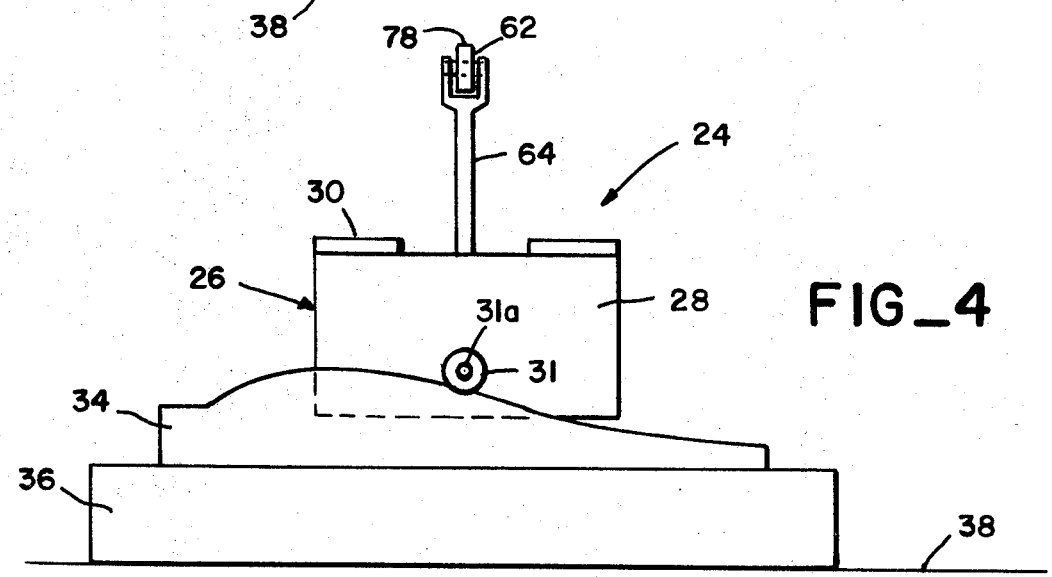
FIG_4
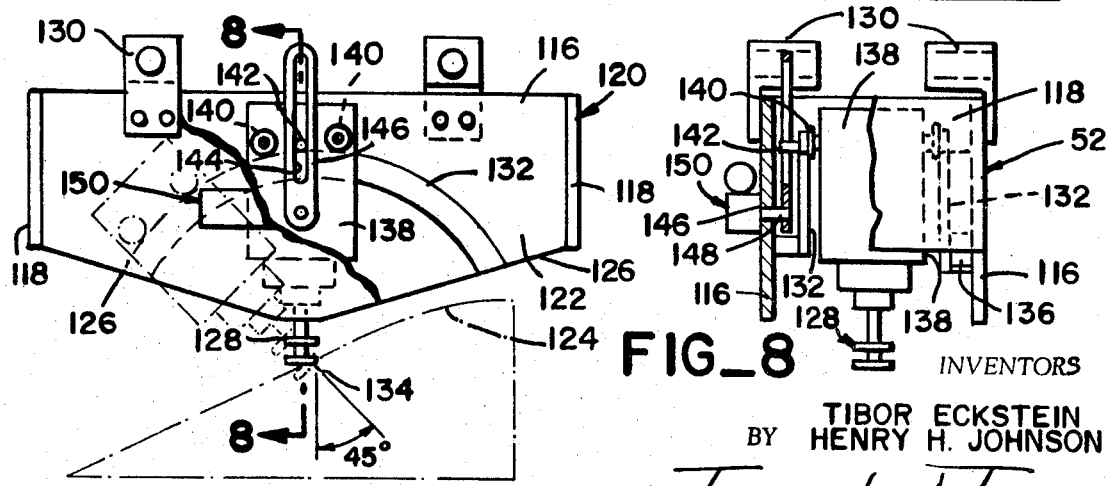
FIG_7  FIG_8
INVENTORS
TIBOR ECKSTEIN
BY HENRY H. JOHNSON
Townsend and Townsend
ATTORNEYS

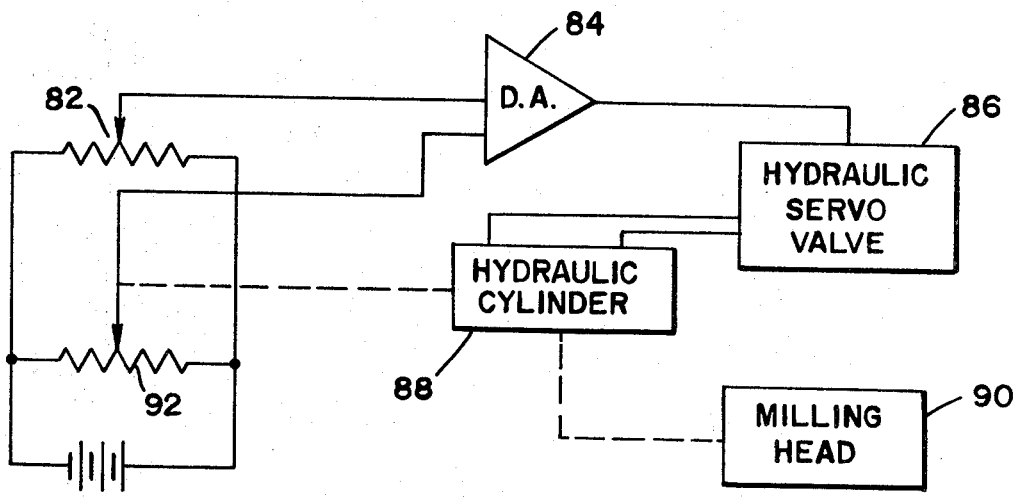
FIG_5
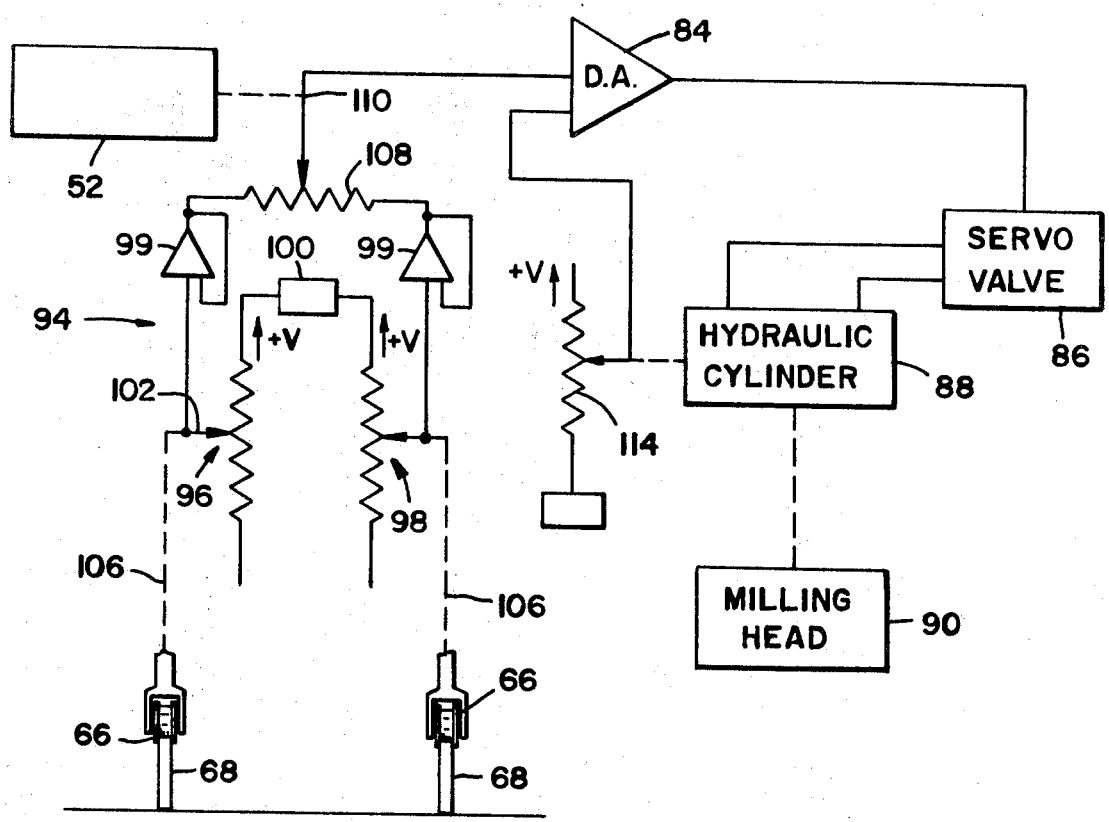
FIG_6
INVENTORS
TIBOR ECKSTEIN
HENRY H. JOHNSON
BY
*Townsend and Townsend*
ATTORNEYS United States Patent Office 3,572,206
Patented Mar. 23, 1971

ABSTRACT OF THE DISCLOSURE

A milling machine for shaping contoured airfoil cores and the like which has a rotary cutter reciprocal in a first direction and movable in a second, transverse direction in incremental steps. Spaced apart cam plates engage cam followers which operate a control and positioning device which in turn continuously adjusts the angular inclination of the rotary tool axis during each reciprocating movement of the tool to maintain the cutting plane of the tool tangent to the contoured core surface. The tool is mounted to a milling head support structure that is tapered away from the core to prevent an interference between steeply angled core surfaces and the support structure and which is further constructed to permit pivotal movement of the rotary tool axis about its cutting point through an arc of 90°.

BACKGROUND OF THE INVENTION

This invention relates to milling machines and more particularly to a milling machine especially well adapted for the milling of airfoil cores having contoured surfaces.

Modern aircraft extensively employ honeycomb airfoil cores in their wing and tail sections to couple high structural strength with light weight. Such core sections may have lengths up to many feet and are directly secured to the skin of the aircraft which forms the actual airfoil.

Aircraft airfoils require the utmost degree of accuracy and since the cores directly support the outer airfoil skins, their surfaces must approach the true airfoil shape as closely as possible. In the past, cores were machined from elongated honeycomb blocks on special machines providing a rotary cutter that reciprocates back and forth over the core while being advanced in increments in the direction perpendicular to the reciprocal movement after each such movement. To approximate the airfoil contour, which is a continuous curve, the cutting plane of the rotary tool, that is the plane cut on the core by the tool during each pass, must be tangent to the airfoil contour. Although this does not yield a true airfoil contour since the tool cuts a planar surface during each pass, the approximation of the airfoil is sufficiently close if the increments of the transverse feed are sufficiently small.

In many airfoils the angular inclination of the tangent of the contour surface varies along the straight or longitudinal line travelled by the cutter during its reciprocating movement between the longitudinal ends of the airfoil core. For example, during a particular pass of the rotary tool the tangent at the inboard end of the core may be several degrees more or less than the tangent at the outboard end of the core.

Prior art airfoil core milling machines provided for a fixed angular inclination of the rotary tool axis during each pass. The inclination of the axis is readjusted according to the required cutting plane angularity between succeeding passes. This results in a compromise since the cutting plane can only be tangent to the airfoil contour at one point during a particular pass. At all other points the cutting plane is non-tangent, resulting in an airfoil core of lesser accuracy and quality.

Although this shortcoming had been known to exist, it was accepted in the past due to the expense and difficulty in continuously controlling and adjusting the angularity of the rotary tool axis.

SUMMARY OF THE INVENTION

The present invention provides a milling machine for shaping contoured surfaces of a workpiece such as an airfoil core. Briefly, the machine comprises a cutting head for mounting a rotary cutting tool and means supporting the cutting head which permits the pivotal movement of the cutting head about a cutting point of the tool to angularly position the tool with respect to the workpiece. Means are provided for reciprocating the supporting means over the workpiece and positioning means define the angular positions of the tool at each point during each reciprocal movement of the supporting means. Adjustment means responsive to the positioning means continuously adjust to the angular position of the reciprocating tool.

In the presently preferred embodiment of the invention the positioning means comprises a pair of spaced apart cam plates having cam surfaces for defining the angular position of the cutter at a pair of preselected points during the reciprocating movement of the supporting means. Means in contact with each cam surface is provided to define the angular position of the tool at all remaining points and the adjustment means is directly responsive to the cam surface contacting means. The contacting means optionally comprises an elongate tilt beam extending in the direction of the reciprocal movement of the supporting means and being coupled with the latter whereby the spacing between the supporting means and the tilt beam defines the angular inclination of the rotary tool and provides for the continuous adjustment of that position. Alternatively, the contact means includes electric circuitry functioning equivalently to the tilt beam for providing the continuous adjustment of the rotary tool axis.

This machine is robust and enables the milling of airfoil cores in which the angularity of the airfoil contour varies over the longitudinal extent of the core during each pass of the rotary tool. The heretofore present imperfections in the core contour from the inability to adjust the angularity of the tool axis continuously during each pass have thus been eliminated. A substantially true airfoil shape is obtained to assure maximum efficiency of the airfoil.

BRIEF DESCRIPTION OF THE DRAWINGS

FIG. 1 is a schematic cross-sectional view of an airfoil core being machined by a rotary cutting tool;

FIG. 2 is a schematic, front elevational view of an airfoil milling machine constructed according to the present invention;

FIG. 3 is a side-elevational view, in section, and is taken on line 3—3 of FIG. 2.

FIG. 4 is an end view and is taken on line 4—4 of FIG. 2;

FIG. 5 is a schematic wiring diagram of control circuits employed in the milling machine illustrated in FIG. 2;

FIG. 6 is a schematic wiring diagram for use in another embodiment of an airfoil milling machine constructed according to the present invention;

FIG. 7 is an enlarged, front elevational view, with parts broken away, of a milling head support structure for use with the airfoil core milling machines illustrated in FIGS. 2 through 4; and FIG. 8 is a side-elevational view taken on line 8—8 of FIG. 7.

DESCRIPTION OF THE PREFERRED EMBODIMENT

FIG. 1 schematically illustrates an end view of an airfoil core 10 which has a rough machined surface 12 that has been cut from a block (not shown) of honeycomb. A rotary cutter 14 of a conventional construction is driven by a motor 16 and reciprocates back and forth over the length of the core. After each pass of the cutter over the core it is advanced towards the rough machined surface in incremental steps in a feed direction substantially perpendicular to the direction of its reciprocating movement (reciprocating direction). The rotary tool defines a cutting point 18 which may be at the edge of the cutter as shown or radially inward of the edge, not shown, for the machining of convex surfaces, and removes material along a cutting plane 20 defined by the rotary cutter. The cutting plane forms a portion of the airfoil contour 22, is a planar surface, and is tangent to the true, curved airfoil contour at the cutting point 18. Thus, the finally milled airfoil core has a contour designed by a multiplicity of relatively narrow, adjoining planar surfaces which equal in number the number of passes off the rotary cutter over the airfoil core.

As is well known to those skilled in the art, airfoils generally taper longitudinally towards a converging point located beyond the outboard end of the airfoil so that longitudinally spaced cross-sections of the core become successively smaller from the inboard towards the outboard end thereof. Consequently, the feed of the rotary cutter is not in parallel line but extends in a radial direction from that converging point. Should a particular airfoil core have parallel sides, so that its cross-sections remain of equal size over the length of the core, the feed of the cutter would be parallel to the cross-sections in straight lines.

If, during a single pass of the rotary cutter, the tangent to the airfoil contour at the cutting point remains constant the angularity of the cutter is set at the beginning of the pass and remains constant throughout that pass. Frequently, however, the tangent to the airfoil contour varies linearly over the length of a pass so that the angular position of the cutter must be constantly adjusted during the pass to maintain the cutting plane tangent to the airfoil contour. The present invention provides apparatus for so adjusting the angularity of the rotary tool axis.

Referring to FIGS. 2 and 3, a milling machine 24 constructed according to the present invention comprises a frame 26 having a pair of side members 28 interconnected by a pair of tie bars 30. The side members include support wheels 31, 32 in engagement with upright tracks 34 having a shape and configuration more fully set forth below. The tracks are mounted on pedestals 36 rising from a floor 38. Thus, frame 26 is movable in the feed direction as guided by the tracks.

A flanged support wheel 32 (on the outboard end of frame 30) engages the outboard track 34 to thereby guide the frame 30 along the longitudinal extent of the track. A flanged wheel 31 on the inboard end of the frame supports the frame on the guiding surface of the inboard track 34. For reasons more fully set forth below the inboard and outboard tracks are normally of different heights. The difference in the straight line spacing between the tracks from differences in the track heights is compensated by guiding wheel 31 which can move in an axial direction in its mounting shaft 31a. Variations in the angularity between guiding surfaces of tracks 34 and the axes of wheels 31, 32 are compensated by spherical bearings (not separately illustrated) mounting the wheels to their respective shafts. Alternatively, wheel 31 can be a cylindrical roller (not shown) of a greater length than the width of the guiding surface of track 34. The roller is axially fixed and compensates for height difference by sliding on the track in an axial direction.

Disposed beneath the frame is a support table 40 to which a core block or honeycomb block 42 is secured. The core has a longitudinal extent L and its ends 42a and 42b are spaced a distance $L_a$ and $L_b$ from tracks 34, respectively. The airfoil core illustrated in FIG. 2 is tapered in its longitudinal direction and its upper surface converges at the outboard converging point 44.

The longitudinal lines (not shown) of the airfoil core also converge at point 44 so that the transverse width of the core increases from end 42a to its end 42b radially with the center of the radius being at converging point 44. To guide the milling machine through the correct path, tracks 34 are circularly arcuate about point 44. Thus, when the frame moves in the feed direction it moves circularly about point 44, the degree of curvature being a function of the spacing of point 44 from the track which in turn is determined by the particular airfoil shape. Generally, however, the degree of curvature is slight since the converging point is relatively far from the outboard end 42a of the core.

FIG. 2 further reveals that the center line of guiding wheels 31, 32 lie on the upper longitudinal airfoil line at each transverse or feed position of the frame. Consequently, tracks 34 have a shape equal to that of the airfoil less the radius of rollers 31, 32 as clearly shown in FIG. 4, and are of unequal height, the outboard track being of a smaller cross-sectional area than the inboard track. During the motion of frame 26 from one to the other end of tracks 34 any point of frame 26 moves through a path having the shape of the airfoil contour.

A pair of elongate guide rails 46 (FIG. 3) are disposed between side members 28 of frame 26 and are secured to inside faces 48 of the side members by mounts 50. A support structure 52 mounting a milling head (not shown in FIGS. 2 through 4) is slideably mounted to guide rails 46. Means such as a chain drive 54 having a chain (not separately shown) secured to the support structure, looped over sprocket (not separately shown) or the like disposed in side members 28 and power driven by a reversible electric or hydraulic motor (not separately shown) or the like is provided for reciprocating the support structure along the guide rails over airfoil core 42. A rotary cutter 56 depends from the milling head in support structure 52 and is positioned so that during each pass of the tool over the core its cutting plane lies on the longitudinal airfoil line 59 interconnecting point 44 and the centerline of guide wheels 31, 32.

To mill the airfoil contour the rotary tool is rotated at relatively high speeds of up to 20,000 r.p.m. and more and drive mechanism 54 is actuated to reciprocate support structure 52 along guide rails 46 over the core. At the end of each pass frame 26 is advanced an incremental step in the feed direction and the rotary tool is again passed over the workpiece to machine another section of the airfoil contour. As mentioned earlier in this specification, the angular inclination of the rotary tool axis requires constant adjustment at the beginning of each pass as well as during each pass over the core to maintain the tool cutting plane tangent to the airfoil contour at the cutting point.

To enable this constant adjustment of the rotary tool axis the present invention broadly provides means for defining the angular position of the tool axis at any location of the cutter during its reciprocating movement along guide rails 46, the positioning means being generally indicated by the reference numeral 60, and means for effecting the repositioning of the tool axis as prescribed by the positioning means, the former means being more fully illustrated in FIGS. 5 through 8.

Referring to FIGS. 2 and 3, the positioning means include a tilt beam 62 extending in the direction of guide rails 46, disposed above tie bars 30 and pivotally connected to a pair of upright cam followers 64. The cam followers are movable in a vertical direction and are slideably mounted in suitable bearings (not shown) secured to inside faces 48 of frame side members 28. The lower end of each cam follower mounts a rotatable cam engaging wheel 66 which in turn is supported by a tangent cam 68 resting on floor 38. As the frame moves in the feed direction during the machining of airfoil core 42 the cam followers and tilt beam move with it and the former move vertically as effected by the upper surfaces of the tangent cams. Thus, differences in the relative height of the tangent cams causes an angular inclination of the tilt beams as illustrated in FIG. 2.

An upright arm 70 extends from support structure 52 past tilt beam 62 and mounts a potentiometer (not shown in FIG. 2) which is turned by a gear 72 secured to the potentiometer actuating shaft. A gear rack 74 is slideably secured to the upper end of arm 70 and includes a roller or wheel 76 which engages an upper surface 78 of tilt beam 62. If the tilt beam is longitudinally inclined, as illustrated in FIG. 2, the reciprocal movement of support structure 52 on guide rails 46 from the lefthand side to the righthand side causes an upward movement of gear rack 74 which is transmitted to gear 72 and, thereby, to the potentiometer. As more fully set forth below, electric signals from the potentiometer are employed to control and adjust the angular position of the rotary tool axis. That angular position is determined by the potentiometer setting which in turn is a function of upper surface 78 of the tilt beam as sensed by gear rack 74 and gear 72.

This spacing is controlled by tangent cams 68. Their configuration is, therefore, critical to the proper functioning of this invention. The tangent cams have a configuration so that the spacing between guide rails 46 and upper surface 78 is such that the resulting angular inclination of the rotary tool axis is precisely tangent to the airfoil contour at any given distance of tool 56 from converging point 44. Ordinarily, the tangent for the airfoil curvature varies, as earlier referred to, so that the tangent cams are of different heights over the cross-sectional extent of the core. This is best illustrated in FIG. 3, where the outboard tangent cam is superimposed in phantom lines over the inboard cam. Should the tangent to the airfoil remain contant over the full extent of a particular longitudinal airfoil line, the tangent cams are of equal height at that point. In FIG. 3 such a point is shown and identified with reference numeral 80.

Since the tangent to the airfoil contour varies linearly over the length of the airfoil and the spaced apart tangent cams define the tangent at two spaced apart points on each longitudinal airfoil line, all of the tangents are defined by the spacing between guide rails 46 and upper surface 78 of tilt beam 62. For example, if it is assumed that along a particular longitudinal line of the airfoil the angularity of the tangent varies between 5° at outboard end 42a and 10° at inboard end 42b of the airfoil, and the tangent cams are shaped so that the rotary tool axis is perpendicular to the tangent at those points, when support structure 52 is midway between the tangent cams, the spacing between guide rail 46 and surface 78 is such that the angular inclination of the rotary tool axis is perpendicular to a 7.5° tangent. The same is true for all other intermediate points of the airfoil along that particular line.

Thus, it can be seen that the provision of the tangent cams and the tilt beam enables a continuous adjustment of the rotary tool axis throughout the reciprocating movement of the support structure and the tool. An airfoil contour of the highest degree of accuracy is thereby obtained without having to tilt the frame in the feed direction.

Referring to FIG. 5, the means for effecting the continuous repositioning of the rotary tool axis comprises a potentiometer 82 which is coupled with gear 72 (shown in FIG. 2) and actuated by gear rack 74 engaging upper surface 78. Electric output signals from the potentiometer are passed through a differential amplifier 84 and hence to an electrohydraulic servo valve 86. The servo valve operates hydraulic cylinder 88 which is mechanically coupled to a milling head 90 mounting the rotary cutter and adjusting the angular position of the cutter axis. The hydraulic actuator (or, alternatively, the milling head 90) is mechanically connected to a second potentiometer 92, the output signals of which are also fed to differential amplifier 84. The two potentiometers are set so that their outputs are equal when the spacing between guide rails 46 and upper surface 78 coincides with the corresponding angular inclination of the cutter axis. If the two positions are non-compatible, the differential amplifier generates an output signal which opens servo valve 86 to energize the hydraulic cylinder and move its pistons in one or the other direction until the potentiometer outputs are again equal, at which point the angular position of the rotary tool axis coincides with the spacing between the guide rails and the upper tilt beam surface.

It should be clear that each airfoil configuration requires its own set of tracks 34 and tangent cams 68. The tracks are replicas of the airfoil contour at their distances from converging point 44 (but their guiding surfaces are recessed by the radius of guide wheels 32). The tangent cams do not bear such a relation and their cam surfaces are determined by the particular tangents of the airfoil contour as well as the operating characteristics of the electrohydraulic control circuits illustrated in FIG. 5. Although the particular tangent cam surfaces could be mathematically determined and machined accordingly, it has been found that it is most convenient and economical to empirically shape them for each airfoil core to be machined.

Referring to FIG. 6, another embodiment of the contour milling machine illustrated in FIGS. 2 through 4 is shown. This embodiment differs from the one previously described in that the tilt beam 62, upright arm 70, gear 72, gear rack 74 and roller 76 of positioning means 60 are replaced by electrical position defining means 94. A pair of potentiometers 96, 98 are mounted to frame 26 (not shown in FIG. 6) and preferably to side member 28, and are subjected to a constant electrical potential from an electric power source 100. Contact arms 102, 204 of the potentiometers are connected to and actuated by cam followers 106 which also include cam engaging wheels 66 riding on tangent cams 68. The contact arms of the potentiometers are actuated by the cam followers as milling machine 26 (not shown in FIG. 6) moves in the feed direction and they are set so that when the tangent cams elevate the cam followers by like amounts their output potentials are equal.

The contact arms are electrically connected with an elongate conductor or resistor 108 which extends parallel to guide rails 46. Ends of the conductor are subjected to the potential from contact arms 102, 104. The potential throughout the length of conductor 108 remains constant if the potentiometer 96, 98 output potentials are equal. If the output potentials vary the potential picked-off conductor 108 by a pick-off member 110 varies linearly between the ends of the conductor. Conductor 108 and pick-off member 110 can, of course, be replaced with a conventional one or multi-turn potentiometer and contact arm that is actuated by a gear and rack arrangement. Differential amplifiers 99 are placed between conductor 108 and contact arms 102, 104 to prevent the loading of potentiometers 96, 98 by conductor 108.

Pick-off member 110 is secured to support structure 52 and is guided along the conductor during the reciprocating movement of the support structure and the rotary cutter. Pickoff member 110 is electrically connected to a differential amplifier 84 which receives its second input from a potentiometer 114 responsive to the angular position of the rotary tool axis. The amplifier output is transmitted to electrohydraulic servo valve 86 which in turn actuates hydraulic cylinder 88 from where the angular position of the rotary tool axis and the position of the contact arm of potentiometer 114 is controlled as described in conjunction with the control mechanism illustrated in FIG. 5.

Functionally, the electric position defining means 94 equal position defining means 60 illustrated in FIGS. 2 through 4. The embodiment of the milling machine illustrated in FIG. 6 however permits the replacement of tilt beam 62. This is desirable in large scale machines where the span between frame side members 28 is many feet and the weight of the tilt beam becomes substantial due to its requirement for rigidity to avoid errors in the reading of the spacing between guide rails 46 and upper surface 78 of the tilt beam.

Referring now to FIGS. 7 and 8, the construction of support structure 52 is illustrated and described in greater detail. The support structure is defined by pair of spaced apart, parallel support members 116 which are joined at their ends by a pair of end plates 118 to define a tubular member 120 having a lower opening 122 facing towards a core 124. Edges 126 of the support members facing the core are tapered upwardly away from the core in the direction from the center of the plate towards the sides of the plate joined by the end plates. During the movement of the support structure over the airfoil core more clearance is thereby provided which enables the machining of airfoil having relatively steep angles (as illustrated in FIG. 7, for example) without interference between the support members and the core.

The support structure is slideably movably secured to guide rails 46 (not shown in FIGS. 7 and 8) by upwardly extending aligned pairs of slide blocks 130 secured to the support members 116.

A pair of circularly arcuate tracks 132 have their center of curvature at cutting point 134 of the rotary tool 128, are spaced from the inside of support member 116 by blocks 136 and are siutably fastened to the support members as by bolts. Each side of a milling head 138 includes a pair of spaced apart rollers 140 which engage the upper track surface of tracks 132. The milling heads further include an upwardly extending finger 142 which is disposed in a slot 144 of a pivotable crank arm 146 that is actuated via a keyed shaft 148 by a hydraulic actuator 150. The actuator is of the type which translates the reciprocal movement of a piston into pivotal movement of the shaft. A particularly well suited actuator is manufactured by Airoyal Manufacturing Company of Roseland, N.Y. 07068, is trademarked "Cylrotor," carries stock number CR20–3.5.

Operation of the hydraulic actuator pivots crank arm 146 and thereby milling head 138 about cutting point 134 along tracks 132. The relatively large size and weight of milling head 138 limits the degree to which it can be pivoted before it interferes with end plates 118. Nevertheless, without the need for excessively enlarging the size of support structure 52, which would in turn require an enlargement of milling machine 24 and a substantial overall cost increase for the milling machine, pivotal movements of 45° to either side of the upright position are possible by mounting guide tracks 132 to the support members 116 and eliminated the heretofore common base plate (not shown) extending transversely to tubular member 120 at the lower opening 122.

Support structure 52, illustrated in FIGS. 7 and 8, is mounted on guide rail 46, illustrated in FIGS. 2 through 4, and electrically and hydraulically connected with the position defining means 94 and the control means illustrated in FIGS. 5 and 6. The hydraulic actuator or milling head is connected with potentiometer 92 or 114 responsive to the angular inclination of the rotary tool axis and the hydraulic cylinder of the actuator is in fluid communication with the electrohydraulic servo valve responsive to the output signals of the differential amplifier. Once the milling machine is set up to machine a particular airfoil configuration, as described earlier, it can do so any desired number of times. Without further altering any adjustment or setting on the milling machine it can be changed to machine an airfoil core of a different configuration by merely replacing the tracks 34 and tangent cams 68 controlling the position defining means.

While one embodiment of the invention has been shown and described, it will be obvious that other adaptations and modifications can be made without departing from the true spirit and scope of the invention.

We claim:

1. A milling machine for shaping relatively wide contour surfaces of a workpiece requiring a plurality of passes of a cutting tool, each pass being offset from a preceding pass in a direction transverse to the cutting direction of the tool during a pass, the machine comprising: a cutting head for mounting the cutting tool; means supporting the cutting head and permitting pivotal movement of the cutting head about a cutting point of the tool when the tool is mounted to the head to angularly position the tool with respect to the workpiece; means for reciprocating the supporting means over the workpiece; means for advancing the supporting means laterally to the reciprocating direction to guide the cutting tool through a plurality of laterally spaced passes over the workpiece; positioning means defining the angular positions of the tool during each pass of the supporting means; and means responsive to the positioning means for continuously adjusting the angular position of the tool during each reciprocating movement of the supporting means.

2. A milling machine according to claim 1 wherein the supporting means includes a track mounting and guiding the head for pivotable movement, the track being circularly arcuate about a cutting edge of the tool, the track extending perpendicularly to the direction of the reciprocating movement of the supporting means.

3. A milling machine according to claim 1 wherein the positioning means includes a cam surface shaped to define the angular position of the tool at a preselected point during each pass of the supporting means, and means cooperating with the cam surface and defining a second position of the tool during each pass of the head.

4. A milling machine according to claim 1 wherein the positioning means comprises a pair of spaced apart cam plates having cam surfaces defining the angular position of the cutting tool at a pair of spaced, preselected points during each pass of the supporting means, and means in contact with each cam surface for defining the angular position of the cutting tool at all remaining points during each pass of the supporting means and wherein the adjusting means is directly responsive to the cam surface contacting means.

5. A milling machine according to claim 4 wherein the cam surface contacting means comprises a tilt beam extending in the direction of the supporting means movement intermediate the cam plates wherein the cam plates are positioned transversely to the direction of the supporting means movement, wherein the positioning means includes cam follower means in engagement with the cam surfaces and the tilt beam for supporting and positioning the tilt beam and wherein the adjusting means comprises means sensing the relative position of the tilt beam and emitting tilt beam position responsive output signals, and means operatively coupled with the sensing means for adjusting the angular position of the tool in accordance with the output signals.

6. A milling machine according to claim 5 wherein the cam surface contacting means comprises an electric conductor having an operative length proportional to the length of the reciprocating supporting means movement, wherein the positioning means includes electric means connected to the conductor means and controlled by the cam surfaces for subjecting ends of the operative length of the conductor means to electric potentials which are responsive to the relative position of the cam surfaces so that the electric potential at any point over the operative length of the conductor means is a function of the electric potentials applied to the conductor means, and wherein the positioning means further includes means cooperating with the conductor means and providing an output signal responsive to the electrical potential at a point of the conductor means corresponding to the relative position of the supporting means during its reciprocating movement; and wherein the adjusting means is controlled and actuated by the output signal.

7. Apparatus for contour milling airfoil surfaces on honeycomb and like materials, the apparatus comprising: a frame including a support rail extending in a first direction; a cutter support movable along the rail and adapted to mount a rotary cutting tool and permitting the continuous angular repositioning of the axis of rotation of the cutting tool so that the cutting plane of the tool can be maintained tangent to the airfoil surface; means for moving the cutting tool in a direction transverse to the length of the rail; positioning means determining the required angularity of the rotary tool axis at a multiplicity of points distributed over the airfoil surface in the direction of the rail length and in a direction transverse to the rail length; and adjusting means responsive to the positioning means for continuously adjusting the angular position of the rotary tool axis to maintain the cutting plane of the tool substantially tangent to the airfoil surface at all times whereby a substantially true, contoured airfoil surface is obtained by moving the cutting tool in a plurality of laterally spaced passes over the material.

8. Apparatus according to claim 7 wherein the cutting tool moving means comprises means for moving the frame relative to the airfoil surface in a second direction substantially perpendicular to the first direction, wherein the positioning means includes a tilt beam extending in a direction of the rail, and tilt beam positioning means determining the spacing between the beam and the rail and varying the angular inclination of the beam with respect to the rail as a function of the angularity of the rotary tool axis during a pass of the tool over the airfoil surface, and wherein the adjusting means includes means responsive to the spacing between the beam and the rail for adjusting the angularity of the rotary tool axis.

9. Apparatus according to claim 8 wherein the last mentioned means includes potentiometer means mounted to the tilt beam and the cutter support for emitting electric output signals to the adjusting means determining the angularity of the rotary tool axis.

10. Apparatus according to claim 7 including wherein the cutting tool moving means comprises means for moving the frame in a second direction transverse to the first direction wherein the positioning means comprises an electric conductor, and means subjecting the conductor to at least two electrical signals having a magnitude determined by the angularity of the rotary tool axis during a pass of the cutter support over the airfoil surface, and electric pick-off means movable over the conductor for emitting output signals responsive to the electrical signals and the relative position of the pick-off means on the conductor, and control means for readjusting the electric signals after each pass of the cutter support for determining the angularity of the rotary tool axis during the succeeding pass of the cutter support over the airfoil; the pick-off means being operatively coupled with the adjusting means to thereby control and determine the angular position of the rotary tool axis.

11. A milling machine for shaping honeycomb airfoils comprising:
a frame having an elongate rail; a support structure reciprocal on the rail; means for reciprocating the structure; means for adjusting the frame with respect to the airfoil in a direction substantially perpendicular to the direction of movement of the structure on the rail; the support structure comprising a pair of substantially parallel, spaced apart support members interconnected by end plates, the members and plates defining a tubular member having a lower opening facing towards the airfoil, a circularly arcuate guide track secured to a support member interiorly of the tubular member; a milling head supported on the guide track for movement thereon and having means for mounting a cutting tool for extension of the cutting tool through the lower opening, and means mounted to the tubular member and in engagement with the milling head for movement of the head on the arcuate tracks to angularly incline the axis of the cutting tool mounting means; and means responsive to the relative position of the frame and the support structure and operatively coupled to the head moving means for determining the relative position of the head on the arcuate tracks.

12. Apparatus according to claim 11 wherein the cutting head is movable on the arcuate track over an arc of at least 90° and wherein an edge of the support members facing towards the airfoil tapers from a center portion of the support member about midway between the end plates away from the airfoil towards the end plates to enable the shaping of the airfoil without interference between the airfoil and ends of the support members spaced from the center portion.

13. In a milling machine for shaping the contour of airfoil cores and the like having a frame, a milling head including means for mounting a rotary cutting tool, means mounting the milling head to the support structure for linear movement of the head in a first direction; means for moving the milling head in incremental steps in a second direction substantially transverse to the first direction, and pivot means for pivoting the milling head about an axis transverse to the first direction to vary the angularity of the rotary axis, the improvement comprising: a pair of spaced apart, parallel cam plates defining a pair of cam surfaces, the cam surfaces extending in the second direction; cam followers movably mounted to the frame and in engagement with the cam surfaces; an elongate member extending in the first direction over the length of the milling head movement movably mounted to the frame and connected to the cam followers so that the position of the member is determined by the cam followers; and control means operatively coupled with the pivot means for operating the pivot means, the control means being responsive to the spacing between the milling head and the member; whereby the angularity of the rotary tool axis is controlled by the member and is continuously adjusted throughout the movement of the milling head to maintain the cutting plane of the rotary tool substantially tangential to the airfoil core contour.

14. In a milling machine for shaping the contour of airfoil cores and the like having a frame, a milling head including means for mounting a rotary cutting tool, means mounting the milling head to the support structure for linear movement of the head in a first direction; means for moving the milling head in incremental steps in a second direction substantially transverse to the first direction, and pivot means for pivoting the milling head about an axis transverse to the first direction to vary the angularity of the rotary axis, the improvement comprising: a pair of spaced apart, parallel cam plates defining a pair of cam surfaces, the cam surfaces extending in the second direction; cam followers movably mounted to the frame and in engagement with the cam surfaces; first potentiometer means controlled by each cam follower and emitting first electrical signals having a magnitude determined by the cam surfaces; conductor means electrically connected to the first potentiometer means and constructed to lineally alter the electric signals over the length of the conductor means for providing second electrical signals over the length of the conductor means of a magnitude being a function of the magnitude of the first electrical signals and the relative position of the milling head on the core; control means including pick-off means engaging the conductor means and providing output signals responsive to the second electrical signals, the control means being coupled to the pivot means for operating the pivot means and positioning the milling head according to the output signals; whereby the angularity of the rotary tool axis is controlled by the cam surfaces and is continuously adjusted throughout the movement of the milling head to maintain the cutting plane of the rotary tool substantially tangent to the airfoil core contour.

References Cited

UNITED STATES PATENTS

| | | | |
|---|---|---|---|
| 2,827,836 | 3/1958 | Horth et al. | 90—13 |
| 2,870,687 | 1/1959 | Roberts et al. | 90—13 |
| 2,937,576 | 5/1960 | Olton | 90—13 |
| 3,065,554 | 11/1962 | Colabella, Jr. | 90—62 |

GIL WEIDENFELD, Primary Examiner

U.S. Cl. X.R.

90—15